United States Patent

[11] 3,591,002

| [72] | Inventor | Nils O. Rosaen<br>Bloomfield Hills, Mich. |
|---|---|---|
| [21] | Appl. No. | 795,629 |
| [22] | Filed | Jan. 31, 1969 |
| [45] | Patented | July 6, 1971 |
| [73] | Assignee | Parker-Hannifin Corporation<br>Cleveland, Ohio |

[54] HIGH PRESSURE FLUID FILTER
11 Claims, 5 Drawing Figs.

[52] U.S. Cl. .................................................. 210/90,
210/456, 210/DIG. 14
[51] Int. Cl. .................................................... B01d 35/14
[50] Field of Search .......................................... 210/90,
304, 306, 456, DIG. 14

[56] References Cited
UNITED STATES PATENTS

| 2,170,074 | 8/1939 | Hewitt | 210/304 X |
| 2,632,566 | 3/1953 | Morrison | 210/90 X |
| 2,753,047 | 7/1956 | Kettlewell | 210/456 X |
| 3,186,549 | 6/1965 | Botstiber | 210/456 X |
| 3,312,344 | 4/1967 | Rosaen | 210/90 |
| 3,313,416 | 4/1967 | Rosaen | 210/90 |
| 3,402,529 | 9/1968 | Frantz | 210/304 X |

*Primary Examiner*—Samih N. Zaharna
*Attorney*—Hauke, Gifford & Patalidis

ABSTRACT: A high pressure fluid filter provided with a pressure responsive member adapted to remain in unchanged position as long as the pressure acting on both sides of the pressure responsive member is balanced but which, upon an unbalance on either side of the pressure responsive member due to a contaminated filter element, is caused to move towards the side where the pressure is less and to thereby mechanically actuate a visual indicator device to signal the particular condition of the filter element and to further provide a bypassing arrangement to bypass the filter element upon an extremely contaminated condition of the filter element.

INVENTOR
NILS O. ROSAEN

ATTORNEYS

INVENTOR
NILS O. ROSAEN

ATTORNEYS 3,591,002

HIGH PRESSURE FLUID FILTER

BACKGROUND OF THE INVENTION

1. Field of the Invention

The present invention relates to fluid filters provided with signal means responsive to a pressure differential to indicate the degree of contamination of the filter element and to provide a signal means for the operator of the apparatus or machinery in which the filter is embodied to clean or replace the filter. It also relates to a fluid filter having means to completely bypass the filter element upon a clogged condition of the filter element in order to maintain system pressure in the fluid system.

2. Brief Description of the Prior Art

Fluid filters incorporating signal devices of various designs and which employ in some way or another pressure responsive moving members adapted to act upon a pressure differential within the filter to change the location and by this movement cause the actuation of the signal member to indicate the internal flow condition of the filter otherwise not noticeable at a location from outside the filter are well known in the art. Means in connection with the indicating means which provide a bypass of the liquid to cause the liquid to flow directly from the inlet to the outlet upon a substantially completely clogged condition of the filter element to prevent rupture or other damage to the filter element are also known. This bypass position is provided upon maximum movement of the pressure responsive member which causes a simultaneous further actuation of the signal means to indicate the bypassing condition of the filter to act as an alarm indicating the need for immediate remedy.

Such indicating and bypassing means have been heretofore provided in various types of inline fluid filters, that is, in filter assemblies comprising a self-contained housing with external conduit connections forming an inlet and an outlet. In most of these applications, however, the fluid conduit layouts had to be designed such as to accommodate the particular inlet and outlet locations of these type filters, which normally are in the offset position relative to each other due to the particular internal constructions of these types of filters.

The present invention provides novel means to overcome the above difficulties.

SUMMARY OF THE INVENTION

The present invention provides an improved fluid filter construction for straight, inline filter applications including novel means for separating the inlet chamber from the outlet chamber and including pressure responsive means to actuate a signalling device to indicate a contaminated condition of the filter element and means associated therewith to bypass the filter element upon a substantially completely clogged condition of the filter element.

In a related further embodiment, a reverse flow filter structure is provided in which the pressure responsive signalling means is constructed in a novel manner and in such a way as to be equally effective in either direction of fluid flow.

Further objects and novel features will become apparent by reference to the following detailed d4scription in connection with the accompanying drawings.

BRIEF DESCRIPTION OF THE DRAWINGS.

In the drawings, two exemplary embodiments of a preferred construction are illustrated, like reference characters refer to like parts throughout the several views in which.

DESCRIPTION OF THE PREFERRED EMBODIMENTS

Figure 1:
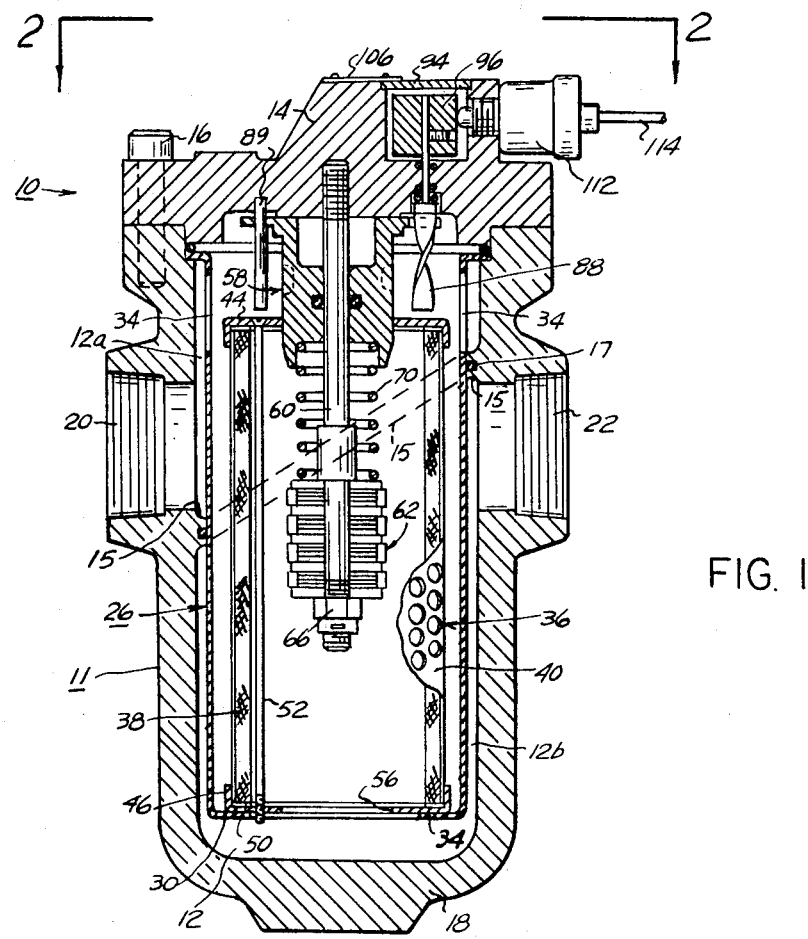
FIG. 1 is a vertical cross section through one embodiment of the novel filter device of the present invention illustrating a bypass filter arrangement.
Figure 2:
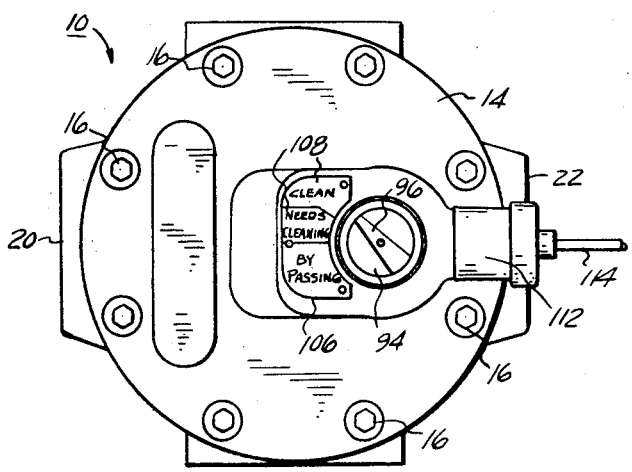
FIG. 2 is a top plan view of the filter device illustrated in FIG. 1.
Figure 3:
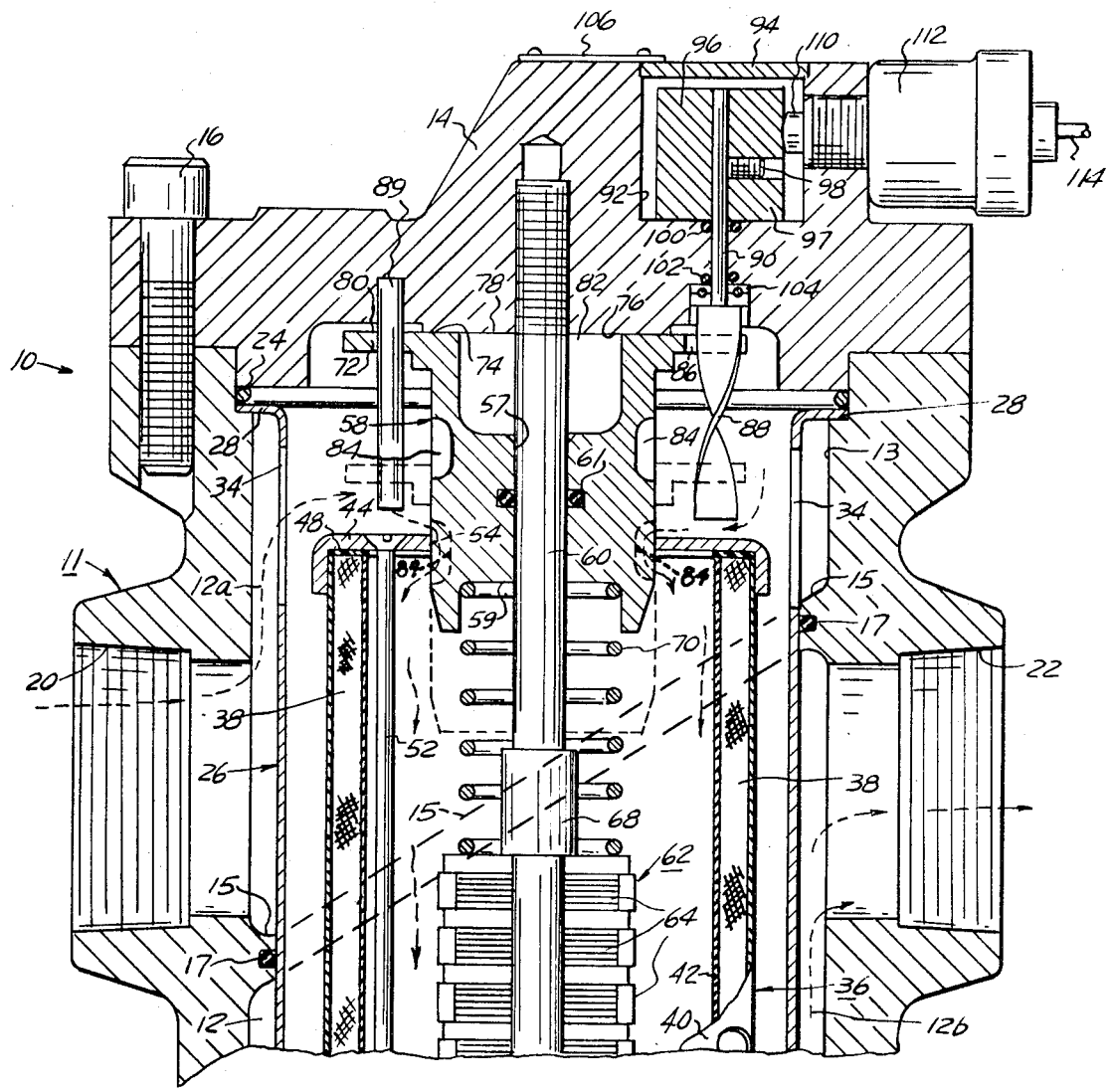
FIG. 3 is an enlarged cross section of the upper portion of the filter illustrated in FIG. 1 to show the construction more in detail.

With reference now to the drawings, in FIGS. 1 to 3, a filter device 10 is shown as being comprised of an outer cylindrical housing member 11 provided with a cylindrical chamber 12. A cap member 14 is secured to the top of the outer housing member 11 by means such as screws 16 to close one end of the chamber 12 and the other end of the chamber 12 is closed by a bottom wall 18. The outer housing member 11 is provided intermediate its top and bottom with an inlet port 20 at one side and an outlet port 22 at its other side opposite therefrom. It will be seen that the inlet 20 and outlet 22 are oppositely axially aligned so as to provide a straight through inline installation for the filter 10. Leakage from the chamber 12 between the cap 14 and the housing 11 is prevented by the provision of an O-ring seal 24 clamped between the cap and the housing.

The filter chamber 12 contains a cylindrical container or inner housing 26 circumferentially spaced from the outer housing wall, which is clamped between the cap 14 and the housing 11 adjacent the O-ring seal 24 by means of an annular radial support flange 28 at the upper open end of the inner container 26. The bottom 30 of the inner container 26 is spaced a distance from the bottom wall 18 of the outer housing 11 and is provided with a central aperture 32 for access into the interior of the container.

The internal surface 13 of the outer housing 11 is provided with an annular inwardly extending diagonally positioned ridge 15 which circumferentially extends all around the inner surface 13 in such way as to lead from adjacent the lower portion of the inlet port 20 diagonally across the chamber 12 towards the upper portion of the outlet port 22. The ridge 15 is of such dimension as to circumferentially abut against the inner container 26 and thus separate the inlet from the outlet and divides the chamber 12 between the inner container 26 and outer housing 11 into an upper chamber 12a and lower chamber 12b. The upper portion of the inner container 26 adjacent the radial support flange 28 within chamber 12a is provided with a plurality of annularly spaced apertures 34 to provide fluid communication from the inlet 20 through the chamber 12a into the interior of the inner container 26. The diagonal dividing ridge 15 is provided with an appropriate O-ring seal 17 or the like to prevent leakage of fluid from chamber 12a past the ridge and into the chamber 12b.

The inner container 26 is adapted to receive and support a cylindrical filter cartridge 36 in coaxially aligned relationship. The filter cartridge 36 is composed of a filter element 38 of conventional filter material which is sandwiched circumferentially for rigidity between an outer perforated baffle 40 and an inner perforated baffle 42 which may be bonded to the element. The open ends of the filter element are capped by end caps 44 and 46 respectively which are suitably sealed against the element by sealing rings 48 and 50. The end caps are axially secured together by a plurality of bolts 52 extending longitudinally through the interior of the filter element and which upon tightening draw the two end caps 44 and 46 towards each other to thus clamp the filter element in between and provide a tight sealing engagement with the sealing rings 48 and 50. The lower end cap 44 sits upon the bottom 30 of the inner container 26 and is provided with a central aperture 54 registering with aperture 34 in the bottom of the inner container 26. The upper end cap 44 is likewise provided with a central aperture 54 coaxial with aperture 56 to permit the extension of a longitudinally movable valve member 58 therethrough which is supported for axial sliding movement on a rod 60 extending centrally into the interior of the filter cartridge 36 and which is screwed into the housing cap member 14. The rod 60 at its lower end within the filter cartridge 36 carries an assembly 62 comprised of a plurality of magnetic discs 64 which are rigidly held in assembled position on the rod by nut 66 which upon tightening compresses the magnetic disc assembly against an abutment 68 integrally provided on the rod 60. The assembly 62 is adapted to collect metal particles which are not trapped by the primary filter cartridge 36.

As can best be seen in FIG. 3, the upper end of the assembly 62 supports an extension spring 70 positioned around the rod 60. The other end of the spring 70 extends into a recess 59 in the bottom portion of the valve member 58. Thus, the valve member 58 is resiliently supported on the rod 60 and is normally held in abutment with the housing cap member 14. The valve member 58 at its upper end is provided with a radially outwardly extending flange 72 having a generally flat upper surface 74 adapted to abut against the bottom surface 76 of a central boss portion 78 extending inwardly from the cap member 14. The central boss portion 78 of the cap member provides in the normal position of the valve member 58 a circumferentially extending space 80 between the radial flange 72 and the cap member 14 as illustrated in solid lines in FIGS. 1 and 3. Additionally, the upper end of the valve member 58 is centrally recessed around the rod 60 as seen at 82 and is laterally provided with a plurality of radially spaced vertical slots 84 provided circumferentially in the outer surface of the valve member and which are normally spaced from the upper end of the filter cartridge 36 for a purpose to be described in detail hereafter.

The internal bore 57 of the valve member 58 is provided with a suitable sealing member such as an O-ring 61 to prevent fluid leakage between the valve member and the rod 60.

At one location, the radial flange 72 of the valve member 58 is provided with an inwardly extending slot 86 which is adapted to receive a rotatable actuator member 88 extending therethrough and into the housing 11 towards the filter cartridge 36. The actuator member 88 preferably comprises an elongated strip of any suitable material having a substantially uniform twist about its longitudinal axis from end to end. Normally, the slot 86 and flange 72 are positioned at the upper end of the actuator 88 adjacent the cap 14. The actuator member 88 is provided with a shaft portion 90 adapted to extend into the cap member 14 and into a recess 92 provided in the cap member 14 which is closed at the top by a slight glass 94. Positioned in the recess 92 for rotation therein by the shaft 90 is a pointer 96 which is secured to the upper end of the shaft 90 by means of a set screw 98. Suitable O-ring seals 100 and 102 are provided in the cap 14 around the shaft 90 at the entrance and exit end to prevent any fluid leakage from the chamber 12 or entrance of foreign matter into the chamber. In addition, a thrust bearing 104 is provided at the end of the actuator 88 supported within the cap 14 to facilitate rotation of the actuator. Since the valve member is caused to move in a straight line and a guide pin 89 is provided to aid in this movement, the slot connection with the twisted actuator causes the actuator to turn and thus rotate the pointer 96 by its connection to the actuator through shaft 90. At the upper surface of the cap member 14 adjacent the sight glass 94 an indicator plate 106 is provided which is divided by markings 108 in indicate the respective clean or contaminated condition of the filter element 38. The pointer 96 will be directed to these markings in relation to its rotation as caused by movement of the valve member 58. The body portion 97 of the pointer is cylindrical and slightly eccentric in relation to the shaft 90 and abuts laterally against a button 110 of an electric switch 112 attached to the cap member 14. The switch 112 has a conduit 114 adapted for connection to an electric indicator device (not shown) positioned at a remote point from the filter installation. Thus, upon rotation of the pointer 96, the switch button 110 will be depressed by the eccentric body portion 97 to produce an electrical signal at some point remote from the filter.

In operation, fluid enters through the inlet 20 into the chamber 12a and is caused to flow upwardly between the inner container 26 and the housing 11 as directed by the diagonal ridge 15 and through apertures 34 into the inner container 26 below the housing cap 14 and then downwardly along the inside of the inner container 26 around the filter cartridge 36 to enter the filter cartridge through the perforations of the outer baffle 40. The fluid then flows through the filter element 38 and leaves the filter element through the perforations in the baffle 42 to travel downwardly through the filter cartridge and out of it through the bottom apertures 56 and 32 into the chamber 12b where the fluid again travels upwardly along the space between the inner container wall and the outer housing wall to exit through the outlet 22. The sealed ridge 15 prevents feedback of fluid from chamber 12b into chamber 12a.

Under normal fluid flow conditions, the fluid pressure on the upstream side of the filter, which acts on the upper side of the flange 72 of the valve member by means of the space 80 provided between the the flange and the cap 14, is balanced on the downstream side by the internal fluid pressure within the cartridge 36 augmented by the extension spring 70 to keep the valve member 58 in its upper inactive position against the boss portion 78 of the cap 14.

As the filter element 38 becomes contaminated by a collection of dirt particles, a pressure drop occurs at the downstream side creating a pressure differential across the valve member 58 since the valve member is positioned intermediate the upstream and the downstream side of the filter. The increase in pressure on the flange 72 of the valve member due to the pressure drop within the filter cartridge 36 causes the valve member to be moved axially downwardly along the rod 90 against the pressure of the spring 70.

As the filter element 38 becomes clogged, the pressure on the inlet side of the element will increase and act upon the upper surface of the valve member 58 to cause valve member 58 to move away from the cap member 14. The first stage movement of the valve member 58 causes a corresponding rotational movement of the pointer 96 towards an intermediate position directed to a mark indicating the filter element needs cleaning (FIG. 2).

Increased contamination of the filter element 38, if not cleaned, and prior to the filter element being in danger of rupturing produces an increase in pressure differential across the valve member 58 causing the valve member to further move away from the cap member 14 along the rod 60 to the position indicated in broken lines in FIG. 3. This movement brings the vertical slots 84 on the outer surface of the valve body to a position intermediate the opening 54 in the filter end cap 46 to provide a direct fluid communication between the inner chamber 12a and the interior of the filter cartridge 36. In this position, the movement of the valve member 58 will have further rotated the pointer 96 to the marking on the indicator plate 106 telling that the filter is now bypassing and requires immediate attention. As indicated by the flow diagram in FIG. 3, in this position of the valve member the major part of the fluid is diverted from the inlet 20 through the apertures 34 and then through the opening 54 of the filter end cap 44 by means of the communicating slots 84 in the valve member 58 into and through the interior of the filter cartridge 36 without passing through the filter element 38. The bypassed fluid then leaves the filter cartridge through the central bottom apertures 56 and 32 and flows upwardly into chamber 12b to exit through the outlet 22.

Figure 4:
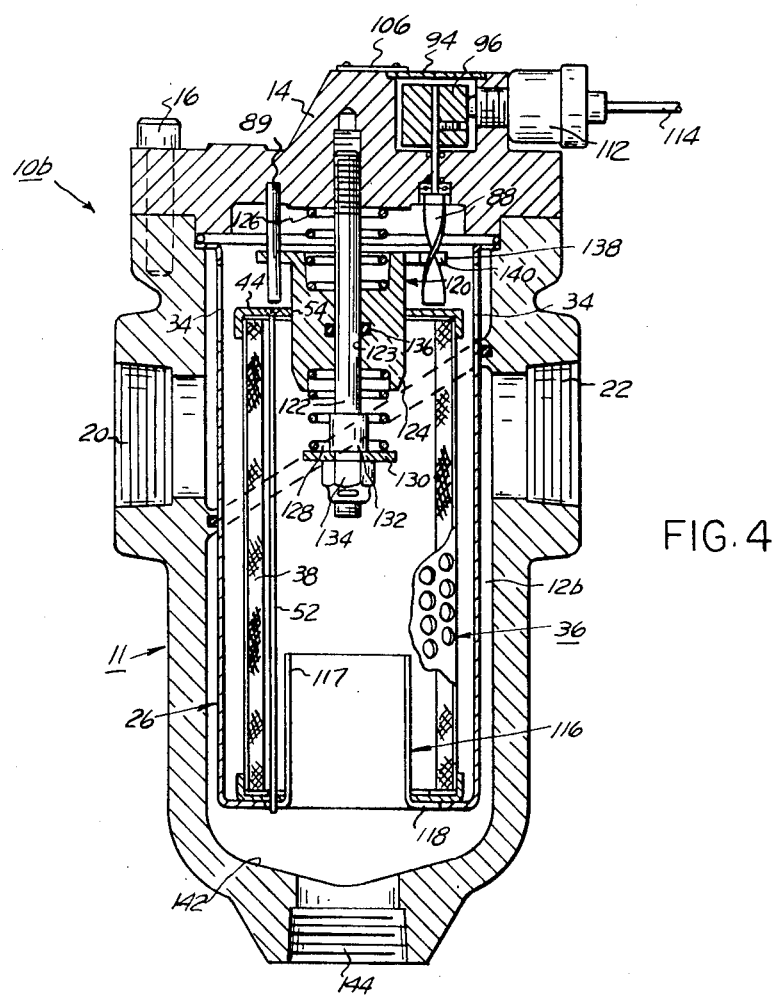
FIG. 4 is a vertical cross section through another embodiment of the novel filter device arrangement.
Figure 5:
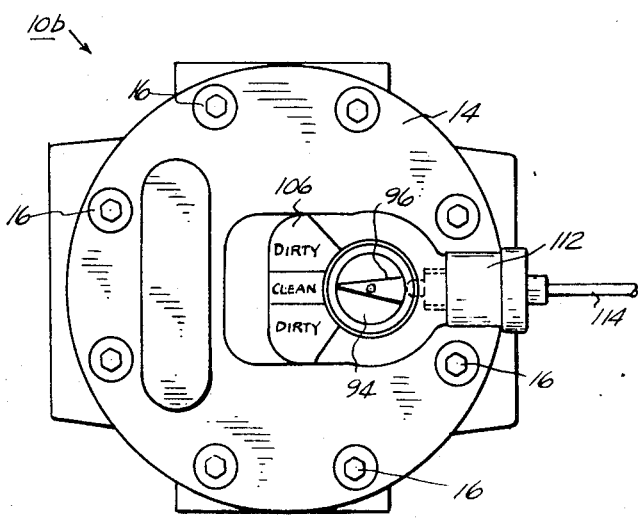
FIG. 5 is a top plan view of the filter device illustrated in FIG. 4.

The embodiment of the filter 10b illustrated in FIGS. 4 and 5 differs from the foregoing embodiment of the filter 10 in that no bypass provision is made, but instead the actuating valve is constructed such as to provide actuation of the indicator pointer in two directions of fluid flow. In addition, no secondary filter element is provided in this embodiment.

In all other respects, the two filters 10 and 10b are alike. Thus, the outer housing 11, the housing cap 14, inner container 26, filter cartridge 36 and the indicator assembly, excepting the valve member, are identical in these structures and are identified by the same reference numerals and need not again to be described.

The filter 10b in FIGS. 4 and 5 contains a dirt trap 116 in the form of a tubular member which is open at both ends and which extends into the filter cartridge 36 through the bottom aperture 56 of the lower filter end cap 46. The dirt trap 116 has a radial flange 118 around its lower end conforming to the bottom aperture 32 in the inner container 26 by which the trap may be secured to the filter end cap 46 by brazing or the like.

The valve assembly 120 in this embodiment is adapted for actuation by a pressure differential created in the filter assembly and comprises a rod 122 screwed into the housing cap 14 which centrally extends into the extends cap 36 through the aperture 54 in the top end cap 44 of the filter cartridge. The rod 122 slidingly supports a valve member 124 which likewise extends into the filter cartridge 36 through aperture 54. Under normal fluid flow conditions, as illustrated in FIG. 4, the valve member 124 is biased into an intermediate position within the aperture 54 by a pair of oppositely balanced springs 126 and 128 in which the upper spring 126 is contained around the rod 122 between the valve member and the housing cap 14 to tend to bias the valve member inwardly of the filter cartridge 36. This tendency is resisted by the force of the lower spring 128 acting in the opposite direction on the valve member 124 tending to move the valve member outwardly of the filter cartridge 36. The lower spring is supported on the rod 122 between the valve member and a plate 130 at the lower end of the rod which is held in place against an abutment 132 by means of a nut 134. The springs 126 and 128 have substantially the same rate and thus normally balance the valve member 124 in an intermediate suspended position around the rod 122. A suitable seal such as an O-ring 136 is provided at the inner bore 123 of the valve member to prevent fluid leakage through the bore 123 along the rod 122.

The upper end of the valve member 124 is provided with an extension arm 138 towards one side which has a slot 140 at its end to receive the twisted actuator member 88 of the indicator assembly for sliding engagement therewith to rotate the pointer 96 upon movement of the valve member. In the normal position of the assembly, as illustrated in FIG. 4, the extension arm 138 engages the actuator member 88 at a point midway between its ends. In this operating position of the filter assembly, pointer 96 will point to the "clean" mark (FIG. 5) and in operation, fluid enters through the inlet 20 into chamber 12a and travels through the apertures 34 into the inner container 26 and then through the filter element 38 and out of the bottom of the filter through the opening 117 in the dirt trap 116 into chamber 12b from where the fluid travels up through the space between the inner container 26 and the outer housing 11 to exit through the outlet 22. In this direction of fluid flow, when the filter element 38 becomes contaminated, a pressure differential will be created across the top of the valve member 124 causing the valve member to be moved downwardly along the rod 122 against the force of the lower spring 128. Downward movement of the valve member causes the pointer 96 to be rotated to the right (in the Drawings) by means of its connection to the twisted actuator 88 to point to the mark "dirty" (FIG. 4), to thus call attention to the fact that the filter needs cleaning or replacing. The fluid will still travel through the filter element as above described.

Upon a reversal of the fluid flow direction, the fluid enters the filter assembly through the port 22 and into chamber 12b to travel downwardly within the space between the inner container and outer housing wall. This fluid movement towards the bottom of the container around the inner container 26 causes some of the dirt particles in the fluid to be scraped off by the container wall to be collected in the bottom 142 of the filter housing 11 which in this instance is provided with a drain plug 144 for periodic removal of the dirt collected in the bottom of the housing. The fluid then enters the filter cartridge through the opening 117 in the dirt trap 116 and passes through the filter element 38 into the interior of the container 26 and through the apertures 34 into the upper chamber 12a from which the fluid exits through the port 20. In this reverse direction of fluid flow, when the filter element 38 becomes contaminated, a pressure differential will be created across the bottom of the valve member 124 causing the valve member to be moved upwardly along the rod member 122 and against the force of the upper spring 126. The upward movement of the valve member causes the pointer 96 to be rotated to the left (in the Drawings) by means of its connection to the twisted actuator 88 to point at the opposite "dirty" mark (FIG. 5) to call attention to the fact that the filter element needs cleaning or replacing. The fluid continues to travel through the dirty filter element.

Thus, this arrangement provides a universal indicator assembly which is effective to show the condition of the filter in either direction of fluid flow.

When it becomes necessary to remove the filter element 38 from either filter assembly 10 or 10b, the screws 16 are removed to lift the filter cap member 14 off the housing 11 together with the indicator device and the valve assemblies, since the valve assemblies are connected to the cap by rod 60 or 122. The filter cartridge 36 can then be lifted out of the inner container 126 through the open top of the housing 11. The described construction permits the filter element to be cleaned or replaced with virtually no loss of the fluid and with little loss of time since the filter cartridge and the unit comprising the cap member, indicator device and valve assembly can be quickly put back in place for immediate return of the filter to operation.

The inner container, as can be seen, provides an effective protective shield across both ports 20 and 22 so that the filter element will not be directly in the path of the incoming high pressure fluid through either port 20 or 22, and is thus protected against damage.

The unique internal housing structure in the present novel device by the provision of a diagonally positioned ridge 15 effectively divides the housing into an inlet and an outlet chamber completely separate from each other and makes a straight inline filter installation possible since the inlet and outlet can be positioned in axially aligned opposing relationship.

The present invention may be embodied in other certain forms without departing from the spirit and essential characteristics thereof. Therefore, the present embodiments are to be considered in all respects as illustrative only and not restrictive, the scope of the invention being indicated by the appended claims rather than by the foregoing description.

I claim:

1. A fluid filter device comprising:
    a housing open at one end and having an inner wall surface defining a chamber, a first port and a second port having their axis substantially coplanar and opening to said chamber, a tubular member disposed in said housing in spaced relation to the inner wall surface of said housing, a ridge formed on the inner wall surface of said housing extending from said inner wall surface into sealing engagement with said tubular member, said ridge extending completely around said inner housing in a plane which intersects the axes of said first and second port and separates said first port from said second port and divides the space between said inner surface and said tubular member into an upper chamber in communication with said first port and a lower chamber in communication with said second port, and filter means disposed within said tubular member having one side in communication with said upper chamber and the opposite side in communication with said lower chamber.

2. The filter device as defined in claim 1 and in which said ports are axially aligned.

3. The filter device as defined in claim 1 and including pressure responsive means carried by said housing and movable in response to changes in the pressure differential across said filter means and means indicating the movement of said pressure responsive means exteriorly of said housing to indicate the condition of said filter element.

4. The filter device as defined in claim 3 and in which said pressure responsive means is movable in opposite directions from an intermediate position depending upon which of said ports is used for an inlet and which is used for an outlet, said indicating means including indicia at two opposite positions indicating the clogged condition of the filter element.

5. A fluid filter device comprising an outer housing having a first port and a second port coaxially aligned with said first port,
said outer housing having a substantially cylindrical chamber;
a cap member removably secured to said outer housing and closing one end of said chamber;
an inner housing defining a container extending into said chamber and circumferentially spaced from said outer housing;
a plurality of apertures provided in said inner housing for communicating said upper chamber with the interior of said inner housing;
said inner housing having an opening in communication with said lower chamber;
a filter cartridge positioned within said container so that upon flow of fluid from said first port to said second port said fluid will flow into said upper chamber between said container and said inner wall through said apertures into the interior of said container and through said filter cartridge into said lower chamber and upon flow of fluid from said second port to said first port said fluid will flow into said lower chamber between said container and said inner wall through said opening into said container and through said filter chamber for exit through said apertures into said upper chamber;
a rod carrier by said cap member for extension into said filter cartridge;
a pressure responsive member axially movably carried on said rod for movement towards and away from said cap member;
means to maintain said pressure responsive member in an inactive position on said rod relative to said cap member; and
visual indicator means operably connected to said pressure responsive member to indicate fluid flow conditions within said filter cartridge within said filter cartridge upon movement of said pressure responsive member in response to a change in the pressure differential between said ports.

6. In the fluid filter device as defined in claim 5, in which said circumferential ridge is provided with a sealing member in abutment with said container to prevent fluid leakage between said upper and said lower chambers.

7. The fluid filter device as defined in claim 5, and in which said means to maintain said pressure responsive member in an inactive position comprises a pair of springs acting in opposite directions on said pressure responsive member to maintain said member in an intermediate suspended position on said rod for movement of said member along said rod in either direction upon a creation of a pressure differential across the top or bottom of said member.

8. A fluid filter device comprising:
a housing open at one end and defining a cylindrical chamber;
a cap member adapted to be removably secured to said housing at said open end to close said chamber;
a first port providing communication of said chamber to the outside of said housing;
a second port providing communication between said chamber and the outside of said housing, said second port being opposite 9. The fluid filter device as claimed in claim 8, in which said pressure responsive means comprises a member slidably supported on a rod, said rod being attached to said cap member for extension into said tubular member and opposite resilient means disposed around said rod to normally maintain said member in a balanced, intermediate, floating, position on said rod.

10. The fluid filter device as claimed in claim 8, in which said annular means comprises a ridge in circumferential abutment with said tubular member.

11. The fluid filter device as claimed in claim 10, in which said ridge extends in diagonal direction through said chamber between said first port and said second port.

UNITED STATES PATENT OFFICE
CERTIFICATE OF CORRECTION

Patent No. 3,591,002                              Dated     July 6, 1971

Inventor(s)  Nils O. Rosaen

It is certified that error appears in the above-identified patent and that said Letters Patent are hereby corrected as shown below:

Col. 1, line 61, delete "d4scription" and insert --description--.

Col. 2, line 2, after "device" insert --of the present invention illustrating a reverse flow filter--.

Col. 3, line 57, after "108" delete "in" and insert --to--.

Col. 5, line 12, after "the" delete "extends" and insert --filter--.

Col. 6, line 50, after "chamber," insert --a cap member removably secured to the housing and closing said open end--.

Col. 6, line 52, after "chamber," insert --said ports being disposed at opposite sides of said housing,--.

Col. 7, between lines 15 and 16 insert the following paragraph: --a circumferential ridge extending from the inner surface of said outer housing into said chamber for radial contact with said container and maintaining said circumferentially spaced relationship, said ridge extending diagonally with respect to the axis of said chamber to separate said first port from said second port and to define an upper chamber in communication with said first port and a lower chamber in communication with said second port;--

UNITED STATES PATENT OFFICE
CERTIFICATE OF CORRECTION

Patent No. 3,591,002      Dated July 6, 1971

Inventor(s) Nils O. Rosaen

It is certified that error appears in the above-identified patent and that said Letters Patent are hereby corrected as shown below:

(cont'd.)      Page 2

Col. 8, line 27, after "opposite" insert --said first port and coaxially aligned therewith;

a tubular member centrally disposed in said housing in spaced relation to the inner wall surface of said housing;

annular means formed on the inner wall of said housing and extending in a plane which intersects the axis of said ports and from said inner wall surface into sealing engagement with said tubular member;

said annular means separating said first port from said second port and dividing said chamber into an upper chamber in communication with said first port and a lower chamber in communication with said second port;

at least one aperture in said tubular member for communication of said upper chamber with the interior of said tubular member;

said tubular member having an opening in communication with said lower chamber and filter means axially disposed within said tubular member so that upon flow of fluid from said first port to said second port, said fluid will flow into said upper chamber between said tubular member and said inner wall, through said aperture into said tubular member, through said filter means into said lower chamber and through said opening to said second

UNITED STATES PATENT OFFICE
CERTIFICATE OF CORRECTION

Patent No. 3,591,002           Dated July 6, 1971

Inventor(s) Nils O. Rosaen

It is certified that error appears in the above-identified patent and that said Letters Patent are hereby corrected as shown below:

(cont'd.)           Page 3 port, and upon flow of fluid from said second port to said first port, said fluid will flow into said lower chamber between said tubular member and said inner wall, through said opening into said tubular member and through said filter means for exit through said aperture, said upper chamber and said first port;

pressure responsive means carried by said housing and movable in response to changes in the pressure differential across said filter means;

said pressure responsive means being movable in opposite directions from an intermediate position depending upon which of said ports is used for an inlet and which is used for an outlet;

means indicating the movement of said pressure responsive means exteriorly of said housing to indicate the condition of the filter means, said indicating means including indicia at two opposite positions and indicating the clogged condition of the filter means.--

Signed and sealed this 29th day of February 1972.

(SEAL)
Attest:

EDWARD M. FLETCHER, JR.           ROBERT GOTTSCHALK
Attesting Officer           Commissioner of Patents